Feb. 14, 1956  J. K. SCOTT  2,735,008
SWEEP CIRCUIT
Filed June 15, 1953
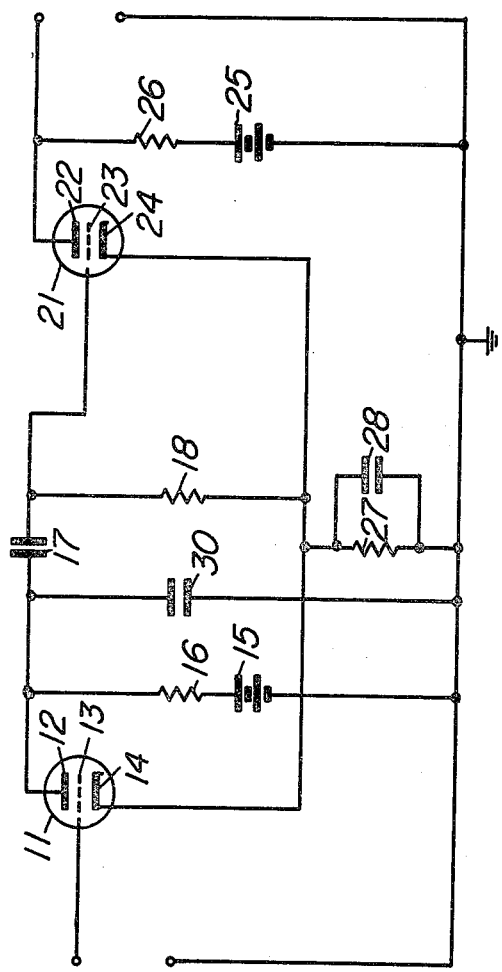
INVENTOR.
JAMES KENNETH SCOTT
By George Sipkin
J. K. Heintjen
ATTORNEYS

United States Patent Office 2,735,008
Patented Feb. 14, 1956

2,735,008
SWEEP CIRCUIT

James K. Scott, North Linthicum, Md., assignor, by mesne assignments, to the United States of America as represented by the Secretary of the Navy Application June 15, 1953, Serial No. 361,562

4 Claims. (Cl. 250—27)

This invention relates to triggered sweep circuits and more particularly to circuits for the generation of sweep signals which may be expanded.

A normal function of a sweep signal is to move the electron beam of a cathode-ray tube across the tube with a known velocity. In many applications, the time in which the beam traverses the tube is used as a calibrated time base. It is often desirable to speed up a slow moving beam to permit the viewing of an expanded portion of the total picture or to slow down the beam to permit the viewing of a compressed image.

It is an object of this invention to provide an improved circuit for generating sweep signals.

Another object of this invention is to provide a triggered circuit for generating sweep signals which may be varied in time duration.

Other objects and advantages of the invention will hereinafter become more fully apparent from the following description of the annexed drawings, which illustrate a preferred embodiment, and wherein:

Fig. 1 is a schematic illustration of the circuit of this invention; and

Fig. 2 and Fig. 3 are graphic representations of the output signal from the circuit of Fig. 1.

Referring now to Fig. 1, the reference numeral 11 designates a triode which has an anode 12, a control grid 13 and a cathode 14 which is biased so that in the absence of an input signal, current flow is cut off. Energy is supplied to the anode 12 by a source of direct voltage such as a battery 15 through a high value anode load resistor 16. A second triode 21, having an anode 22, a control grid 23 and a cathode 24, is biased so that it is normally conducting. The anode 12 of the triode 11 is coupled to the control grid 23 of the triode 21 by a coupling capacitor 17, and a resistor 18 connects the control grid 23 to the cathode 24. Energy is supplied to the anode 22 by a source of direct voltage such as a battery 25 through an anode load resistor 26. The cathodes 14 and 24 are connected together and are coupled to ground by a cathode resistor 27 which is by-passed by a capacitor 28, and a capacitor 30 is connected in parallel with the anode circuit of the triode 11, which circuit comprises the resistor 16 and the battery 15.

In the absence of a trigger pulse, the triode 11 is non-conducting and the capacitors 17 and 30 are charged by the battery 15. No current then flows through the resistor 18 and the output of the triode 21 is constant. When a triggering pulse is applied to the control grid 13, the triode 11 conducts for the duration of the trigger pulse and the capacitors 17 and 30 begin discharging through the triode 11. Current then flows through the resistor 18 and the voltage drop across the resistor 18 biases the triode 21 beyond cut-off. Conduction through the triode 21 having stopped, there is no current flow through the anode load resistor 26 and the voltage of the anode 22 rapidly rises to the open-circuit voltage of the source 25. In Fig. 2 and Fig. 3, 31 and 31' represent the amplitude of the voltage of the anode 22 when the triode 21 is conducting, but when the triode 21 is cut off, the voltage of the anode 22 rapidly rises as shown at 32 and 32'.

The impedance of the triode 11 and the resistance of the cathode resistor 27 are low and the time constant of the discharge path of the capacitor 30 is also low. Therefore, during the period of time that the triode 11 conducts, the capacitor 30 will discharge through the triode 11 until the voltage drop across it is the same as the voltage drop across the triode 11. The anode load resistor 16 is of a high value so that when the triode 11 conducts, the voltage at the anode 12 will be greatly decreased. The value of the resistor 18 is large and the time constant of the discharge path for the capacitor 17 is high. Therefore, during the period of time that the triode 11 conducts, the capacitor 17 will not discharge appreciably.

Upon decay of the triggering pulse, the triode 11 ceases conducting. The time duration of the triggering pulse is very short and if the circuit were to return to its former condition at the end of the triggering pulse, the output pulse from the triode 21 would be short. The waveform shown in Fig. 2 is illustrative of a pulse output from the triode 21 if the triode 21 were cut off during duration of the triggering pulse only. The capacitor 30 is added to provide a second discharge path for the capacitor 17, hence, when the triode 11 stops conducting, the capacitor 17 continues to discharge through the capacitor 30 until the voltage drop across the two capacitors is equal, and the triode 21 is maintained non-conducting for an interval which is longer than the duration of the triggering pulse. Fig. 3 is illustrative of a pulse output from the triode 21 when an additional discharge path for the capacitor 17 is provided. It is apparent that the flat portion 33' of the pulse is expanded over the portion 33 of Fig. 2 and the pulse endures for a longer period of time than the pulse of Fig. 2. The width of the pulse output from the triode 21 can be determined by the value of the capacitor 30 and pulses of selected widths can be obtained by substituting several capacitors with an appropriate selector switching means for the capacitor 30.

The output pulse of the circuit of this invention is suitable as a sweep current for cathode-ray tubes which have magnetic deflection if the time constant of the deflecting coils is large compared with the length of the pulse. In radar and the like installations, it is desirable to produce sweep pulses of various lengths for range changing and this invention has particular applicability in such systems.

Obviously many modifications and variations of the present invention are possible in the light of the above teachings. It is therefore to be understood that within the scope of the appended claims the invention may be practiced otherwise than as specifically described.

What is claimed is:

1. A circuit for generating a sweep current comprising a highly evacuated first triode having a first anode, a first cathode and a first control grid; a first source of direct energy; a first resistor connecting said first source to said first anode; a first capacitor having a first end and a second end; said first end being connected to the junction of said first resistor and said first anode; a second resistor of high value connecting said second end to said first cathode; a second capacitor connected from said first end to said first cathode; and an output circuit comprising solely a second electron discharge device having a second anode, a second cathode and a second control grid; a second source of direct energy; and a third resistor connecting said second source to said second anode; said second control grid being connected to the junction of said second end and said second resistor; said second electron discharge device being biased to conduct during charging of said first and second capacitors and during periods of no current flow through said second resistor but being biased to cut-off by the voltage drop across said second resistor produced by the flow of discharge current of said first capacitor therethrough.

2. A pulse forming circuit comprising a first capacitor, a first resistor connected in series with said first capacitor, said first capacitor-first resistor combination having a first predetermined time constant, a first electrical energy source connected across said first capacitor and said first resistor in series for charging said first capacitor, a second capacitor connected across said first energy source to be charged thereby and across said first capacitor and said first resistor in series, means for periodically reducing the voltage of said source and simultaneously providing means for discharging said first capacitor through said first resistor and for discharging said second capacitor, the discharge path of said second capacitor having a time constant of a lower value than said first predetermined time constant, whereby said second capacitor discharges before said first capacitor thereby providing an additional discharge path for said first capacitor, an output circuit, and means responsive to discharge current of said first capacitor flowing through said first resistor to prevent current flow in said output circuit.

3. The circuit defined in claim 2 wherein said output circuit comprises a second electrical energy source and a second resistor connected in series with said second source; and wherein said means responsive to discharge current flowing through said first resistor comprises solely a first electron discharge device having a first anode, a first cathode and a first control grid; said output circuit being connected across said first anode and said first cathode to provide an electron flow from said first cathode to said first anode through said first discharge device; said first control grid being connected to the junction of said first capacitor and said first resistor to cut-off said electron flow through said first discharge device when discharge current of said first capacitor flows through said first resistor.

4. The circuit defined in claim 3 wherein said means for periodically reducing the voltage of said first source comprises a highly evacuated second electron discharge device having a second anode, a second cathode and a second control grid; said anode being connected to the junction of said first source and said first and second capacitors; said second cathode being connected to the junction of said first resistor, said first source and said second capacitor; said second electron discharge device being biased beyond cut-off; and means for applying a positive pulse of short duration to said second control grid to render said second electron discharge device conductive; the period during which said second electron discharge device conducts being small with respect to the period during which said first electron discharge device is non-conductive.

References Cited in the file of this patent
UNITED STATES PATENTS
2,592,611   Simon et al. _____ Apr. 15, 1952